Patented May 1, 1951

2,551,353

UNITED STATES PATENT OFFICE 2,551,353

INTERPOLYMERS OF CASTOR-OIL MALEATE

Pliny O. Tawney, Passaic, N. J., assignor to United States Rubber Company, New York, N. Y., a corporation of New Jersey No Drawing. Application March 18, 1949, Serial No. 82,298

16 Claims. (Cl. 260—23)

This invention relates to a method of increasing the yield of soluble, convertible polymeric materials obtained from the copolymerization of a castor-oil maleate and copolymerizable monoolefinic compounds. More particularly, my invention comprises copolymerizing a castor-oil maleate with at least one copolymerizable monoolefinic compound, in the presence of a cyclic terpene hydrocarbon, whereby high yields of soluble, unsaturated convertible resins are obtained which are new ternary interpolymers.

Copolymers of castor-oil maleates with monoolefinic compounds, e. g., styrene, are in many respects well adapted to the preparation of coating and laminating compositions which, after application, can be cured to a solvent- and heat-resistant state. In this connection they are particularly suitable for blending with other thermosetting resins, e. g., urea-formaldehyde resins, and melamine-formaldehyde resins to secure more flexible products. However, such resins derived from castor-oil maleates of high acid number, e. g., 50–100, i. e., those containing relatively large amounts of maleic acid ester groups (such as are obtained, for example, from the reaction of one mole of castor-oil with 2-3 moles of maleic anhydride in a manner well known to those skilled in the art), tend to form an insoluble gel during the copolymerization reaction, and before more than a minor proportion of monomers has been converted to the copolymeric form. Such products are of limited commercial utility since the presence of the masses of insoluble gel effects discontinuities in the resulting coating or laminate such as cracks, lumps and blisters. A soluble resin can be obtained, albeit in low yields, by halting the copolymerization prior to gelation, although the large amounts of unreacted monomeric starting materials remaining must be removed, purified and recycled for use in subsequent copolymerization in order to achieve some degree of economic feasibility. The copolymerization of castor-oil maleates of relatively low acid number, e. g., 20–40 (such as can be obtained from the reaction of 0.3–0.6 mole of maleic anhydride with one mole of castor-oil), with styrene shows a diminished tendency toward premature gelation but the resulting resins are softer, less mar-resistant and often require more stringent curing conditions to achieve a satisfactory degree of solvent- and heat-resistance in the final product than those derived from the castor-oil maleates of higher acid number.

I have now discovered that when a castor-oil maleate is interpolymerized with styrene in the presence of an appreciable amount of a cyclic terpene hydrocarbon, marked increases in the yield of soluble resins, which are new ternary interpolymers, can thereby be obtained. Moreover, I have unexpectedly found that as the amount of the interpolymerizable terpene in the initial reactant mixture is increased, the amounts of the castor-oil maleate and styrene converted to the soluble polymeric form are likewise increased. Suitable cyclic terpenes include, e. g., the methenes, terpinenes, limonene, dipentene, alpha-pinene and mixtures thereof, especially turpentine. These cyclic terpenes have the general formula $C_{10}H_{16}$ and are unsaturated.

Although styrene has been cited above as illustrative of the monoolefinic compounds which are suitable for copolymerization with castor-oil maleates in the method of my invention, various substituted styrenes may also be employed, including the alpha- and para-substituted styrenes, e. g., p-chlorostyrene, p-methylstyrene, alpha, p-dimethylstyrene, p-fluorostyrene, p-trichloro-methylstyrene, p-methoxystyrene, and 2,5-dichlorostyrene. The styrenes can be replaced in whole or part by other monoolefinic hydrocarbons, e. g., vinylnaphthalene and aliphatic olefinic hydrocarbons, especially the lower aliphatic olefinic hydrocarbons, i. e., those having from 2 to 6 carbon atoms, e. g., ethylene, propylene and isobutylene, although many of the more reactive olefins suffer the economic disadvantage of being gases at room temperature and hence they will require pressurized equipment for the copolymerization reaction.

Other suitable monoolefinic compounds which may be used in place of styrene but which tend to yield softer resins include vinyl mono-esters of non-enic acids, e. g., vinyl acetate, vinyl butyrate and vinyl benzoate, and monovinyl ethers, e. g., vinyl ethyl ether, vinyl propyl ether and vinyl benzyl ether, and the esters of monoolefinic monocarboxylic acids with non-enic alcohols, e. g., methyl acrylate, n-butyl acrylate, tolyl acrylate, methyl methacrylate, n-ethyl chloroacrylate and methyl crotonate. The monoolefinic acids themselves can be employed although the resulting resins are more sensitive to water and other hydroxylic solvents and to alkali. Besides esters other hydrolyzable derivatives of such monoolefinic acids can be employed, such as acid chlorides, nitriles and amides, the two latter yielding resins which are harder but are compatible with fewer solvents.

The castor-oil maleates, as is well known to those skilled in the art, are prepared by the esterification of maleic acid or maleic anhydride with castor-oil. Usually about 1 mole of castor-oil is employed per mole of maleic anhydride. This invention also contemplates the employment of castor-oil esters obtained by substitution of some or all of the maleic anhydride by the homologues of maleic acid, such as citraconic acid or citraconic anhydride. If desired, various modifying ingredients, such as linseed oil, may be present in the reaction mixture during the preparation of the ester to be employed in this invention.

case. The reaction mixtures are then diluted with an excess of methanol and the precipitated interpolymers are thoroughly washed with methanol before drying in vacuo to constant weight.

Table I below summarizes the amounts of the olefinic compound (100 parts of the castor-oil maleate being used in all cases), the cyclic terpene, peroxide, and the resulting soluble interpolymer, as well as the reaction times. To emphasize the advantage of my method, examples of prior art copolymerization in the absence of cyclic terpene hydrocarbons are also included (I–a, b, h).

*Table I*

| | Olefinic Compound | Terpene Or Solvent | Benzoyl Peroxide | Reaction Time, hrs. | Soluble Inter-Polymer |
|---|---|---|---|---|---|
| a | Styrene 121 | | 1.1 | 4.7 | 15.2 |
| b | Styrene 121 | Benzene, 186.0 | 2.04 | 6.4 | 24.2 |
| c | Styrene 121 | Turpentine, 81.5 | 3.02 | 7.4 | 40.0 |
| d | Styrene 121 | Turpentine, 161.5 | 3.83 | 18.2 | 63.8 |
| e | Styrene 121 | Turpentine, 325.0 | 16.4 | 64.0 | 143.0 |
| f | Styrene 121 | Dipentene, 325 | 8.15 | [1] 87.0 | 42.3 |
| g | Styrene 121 | Alpha-Pinene, 318 | 8.00 | 54.0 | 94.6 |
| h | Vinyl Acetate 100 | | 1.0 | 9.0 | 21.7 |
| i | Vinyl Acetate 100 | Turpentine, 326 | 18.3 | 71.0 | 39.8 |

[1] No evidence of incipient gelation.

In the practice of my invention, a castor-oil maleate, preferably one having an acid number of from about 30 to 100, is reacted with from 0.5 to 20, particularly 3 to 12, moles of a copolymerizable monoolefinic compound (per mole of castor-oil maleate) in the presence of from about 6 to 120 moles, especially 6 to 30 moles, of a cyclic terpene hydrocarbon per mole of the castor-oil maleate. The reaction proceeds readily at temperatures in the range 25–120° C., preferably 40–100° C., for a time sufficient to form at least an appreciable quantity of the soluble interpolymer. Suitable reaction times will usually be found to be in the range of from 5 to 90 hours. Suitable promoters or catalysts for the reaction include conventional sources of free radicals such as organic peroxides, e. g., benzoyl peroxide, acetyl peroxide and tertiary-butyl hydroperoxide, in amounts of from about 0.1 to 10.0% by weight of the copolymerizable reactants.

In the interpolymerization reaction, the increasing viscosity of the reaction mixture can be employed as a measure of the extent of the reaction. The resulting soluble interpolymer can be isolated from the reaction mixture by evaporation of the cyclic terpene hydrocarbon or by precipitation of the interpolymer through addition of a non-solvent, e. g., methanol.

The resulting resins can be dissolved in appropriate solvents, e. g., acetone, xylene, or by mixtures thereof and employed as coating, impregnating or laminating compositions, either alone or in conjunction with other polymeric materials such as urea-formaldehyde resins. Upon application of heat, these compositions are converted to a solvent- and heat-resistant state.

The following example discloses my invention in more detail. All parts are by weight.

EXAMPLE 1

Castor-oil maleate (acid number, 54) is interpolymerized with styrene or vinyl acetate, respectively, in the presence of various cyclic terpenes. The reactions are carried out at 60° C. in the presence of benzoyl peroxide, until the point of incipient gelation is attained in each Comparison of I–a with I–c above shows that the presence of even relatively small amounts of the interpolymerizable cyclic terpene hydrocarbon in the interpolymerization of castor-oil maleates with the designated monoolefinic compounds effects a very significant increase in the yield of soluble interpolymeric product. Succeeding examples indicated the further increase in yields of the soluble interpolymer obtainable from reaction mixtures containing large proportions of the cyclic terpene hydrocarbon.

EXAMPLE 2

A mixture of 54 parts of castor-oil maleate (acid number, 71), 63 parts of styrene and 280 parts of turpentine is heated at 83° C. for 14 hours during which time 4 two-part increments of benzoyl peroxide are added from time to time. About 63.4 parts of acetone-soluble interpolymer are obtained.

A mixture of 5.29 parts of a 33.1% solution of the above interpolymer in xylene and 1.36 parts of a 54.8% solution of a commercial urea-formaldehyde resin in xylene is thinned with a small amount of 1:1 (by weight) mixture of xylene and butanol. The solution is spread onto a glass plate and baked at 150° C. for 30 minutes to yield a hard, tough, clear film which is insoluble in xylene and butanol.

Having thus described my invention, what I claim and desire to protect by Letters Patent is:

1. A method which comprises heating a mixture of 6 to 120 moles of a cyclic terpene hydrocarbon, 1 mole of an ester of castor-oil and an unsaturated dibasic organic acid selected from the group consisting of maleic acid and its homologues, said ester having an acid number of 30 to 100, and 0.5 to 20 moles of another copolymerizable monoolefinic compound at a temperature of 25° to 120° C. in the presence of an organic peroxidic polymerization catalyst in amount of from 0.1 to 10.0% by weight of the said reactants, whereby a fusible, convertible interpolymer of the said reactants is formed.

2. A method which comprises heating a mixture of 6 to 30 moles of a cyclic terpene hydrocarbon, 1 mole of a castor-oil maleate having an acid number of 30 to 100, and 3 to 12 moles of another copolymerizable monoolefinic compound at a temperature of 40°–100° C. in the presence of an organic peroxide polymerization catalyst in amount of from 0.1 to 10.0% by weight of the aforesaid reactants, whereby a soluble, convertible interpolymer of said reactants is formed.

3. A method as in claim 2 in which the cyclic terpene hydrocarbon substance is turpentine.

4. A method as in claim 2 in which the cyclic terpene hydrocarbon is alpha-pinene.

5. A method as in claim 2 in which the cyclic terpene hydrocarbon is dipentene.

6. A method as in claim 2 in which the cyclic terpene hydrocarbon substance is turpentine and the additional copolymerizable monoolefinic compound is styrene.

7. A method as in claim 2 in which the cyclic terpene hydrocarbon is turpentine and the additional copolymerizable monoolefinic compound is vinyl acetate.

8. A method as in claim 2 in which the cyclic terpene hydrocarbon is turpentine and the additional copolymerizable monoolefinic compound is a lower aliphatic monoolefinic hydrocarbon.

9. A soluble convertible interpolymer of a cyclic terpene hydrocarbon, an ester of castor-oil and an unsaturated dibasic organic acid selected from the group consisting of maleic acid and its homologues, said ester having an acid number of 30 to 100, and another copolymerizable monoolefinic compound.

10. An interpolymer of a cyclic terpene hydrocarbon, a castor-oil maleate, and another copolymerizable monoolefinic compound.

11. An interpolymer as in claim 10, in which the cyclic terpene hydrocarbon substance is turpentine.

12. An interpolymer as in claim 10, in which the cyclic terpene hydrocarbon is alpha-pinene.

13. An interpolymer as in claim 10, in which the cyclic terpene hydrocarbon is dipentene.

14. An interpolymer as in claim 10, in which the cyclic terpene hydrocarbon substance is turpentine and the additional copolymerizable monoolefinic compound is styrene.

15. An interpolymer as in claim 10, in which the cyclic terpene hydrocarbon substance is turpentine and the additional copolymerizable monoolefinic compound is vinyl acetate.

16. An interpolymer as in claim 10 in which the cyclic terpene hydrocarbon substance is turpentine and the additional copolymerizable monoolefinic compound is a lower aliphatic monoolefinic hydrocarbon.

PLINY O. TAWNEY.

REFERENCES CITED

The following references are of record in the file of this patent:

UNITED STATES PATENTS

| Number | Name | Date |
|---|---|---|
| 2,439,953 | Swiss et al. | Apr. 20, 1948 |

FOREIGN PATENTS

| Number | Country | Date |
|---|---|---|
| 573,809 | Great Britain | Dec. 7, 1945 |
| 580,912 | Great Britain | Sept. 24, 1946 |